Figure 5:
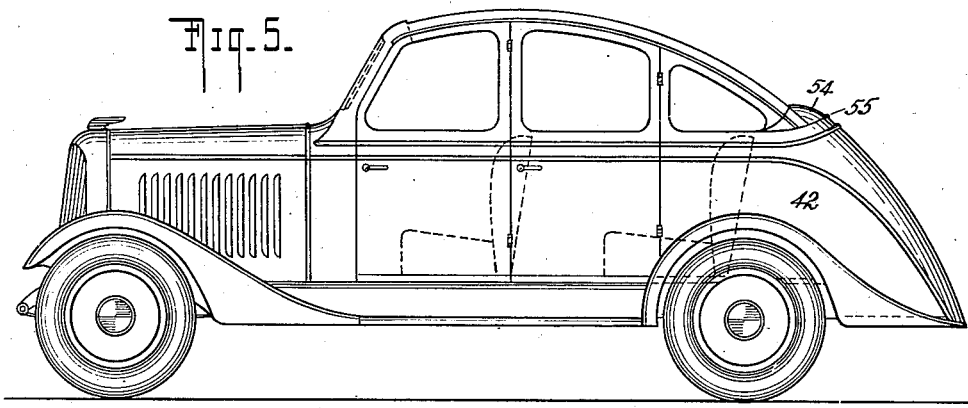

Sept. 3, 1935.    H. O. METZ    2,013,314
AUTOMOBILE ROOF CONSTRUCTION
Filed March 22, 1934    3 Sheets-Sheet 1
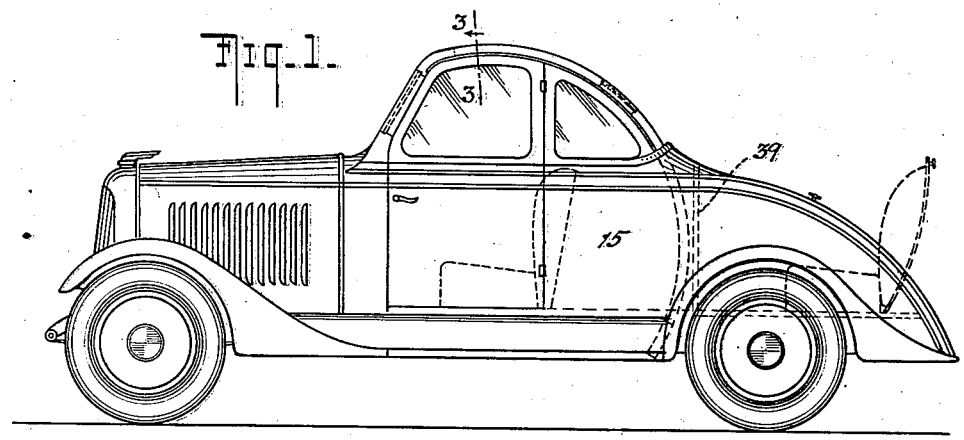
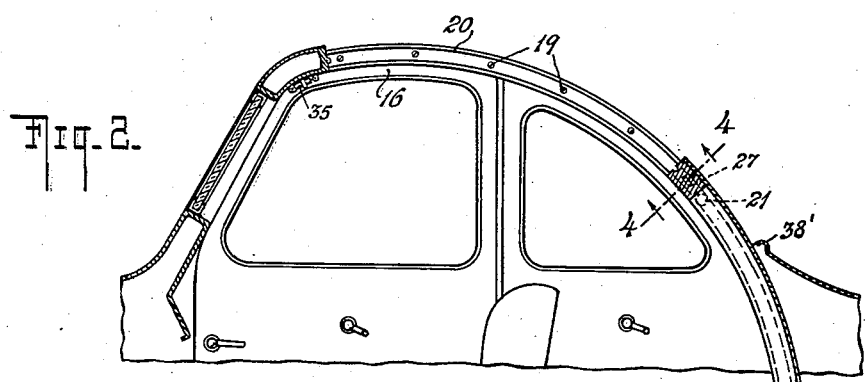
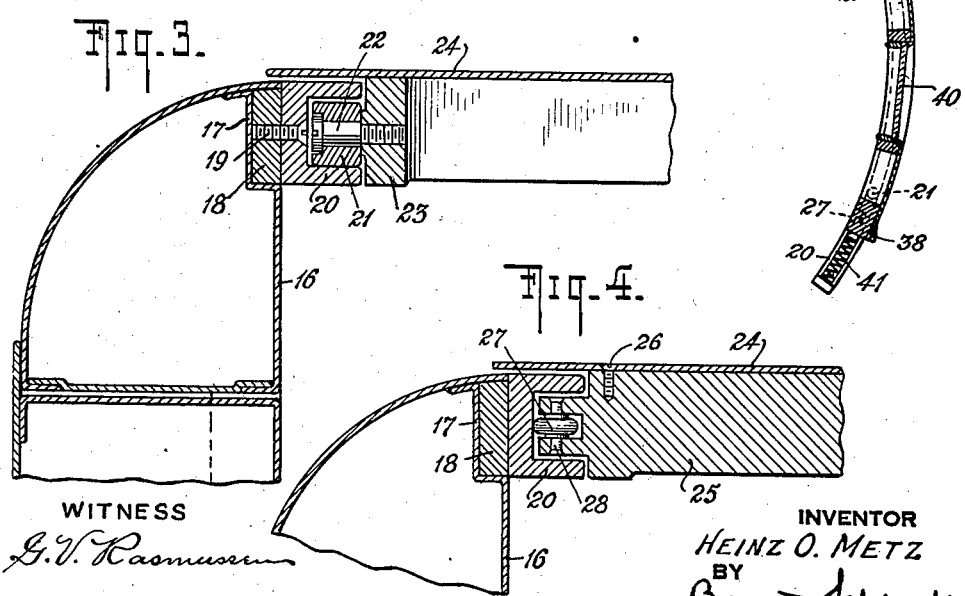
WITNESS
*G. V. Rasmussen*
INVENTOR
HEINZ O. METZ
BY
ATTORNEYS Sept. 3, 1935.  H. O. METZ  2,013,314

AUTOMOBILE ROOF CONSTRUCTION

Filed March 22, 1934  3 Sheets-Sheet 2

WITNESS
G. V. Rasmussen

INVENTOR
HEINZ O. METZ
BY
ATTORNEYS

Sept. 3, 1935. H. O. METZ 2,013,314
AUTOMOBILE ROOF CONSTRUCTION
Filed March 22, 1934 3 Sheets-Sheet 3
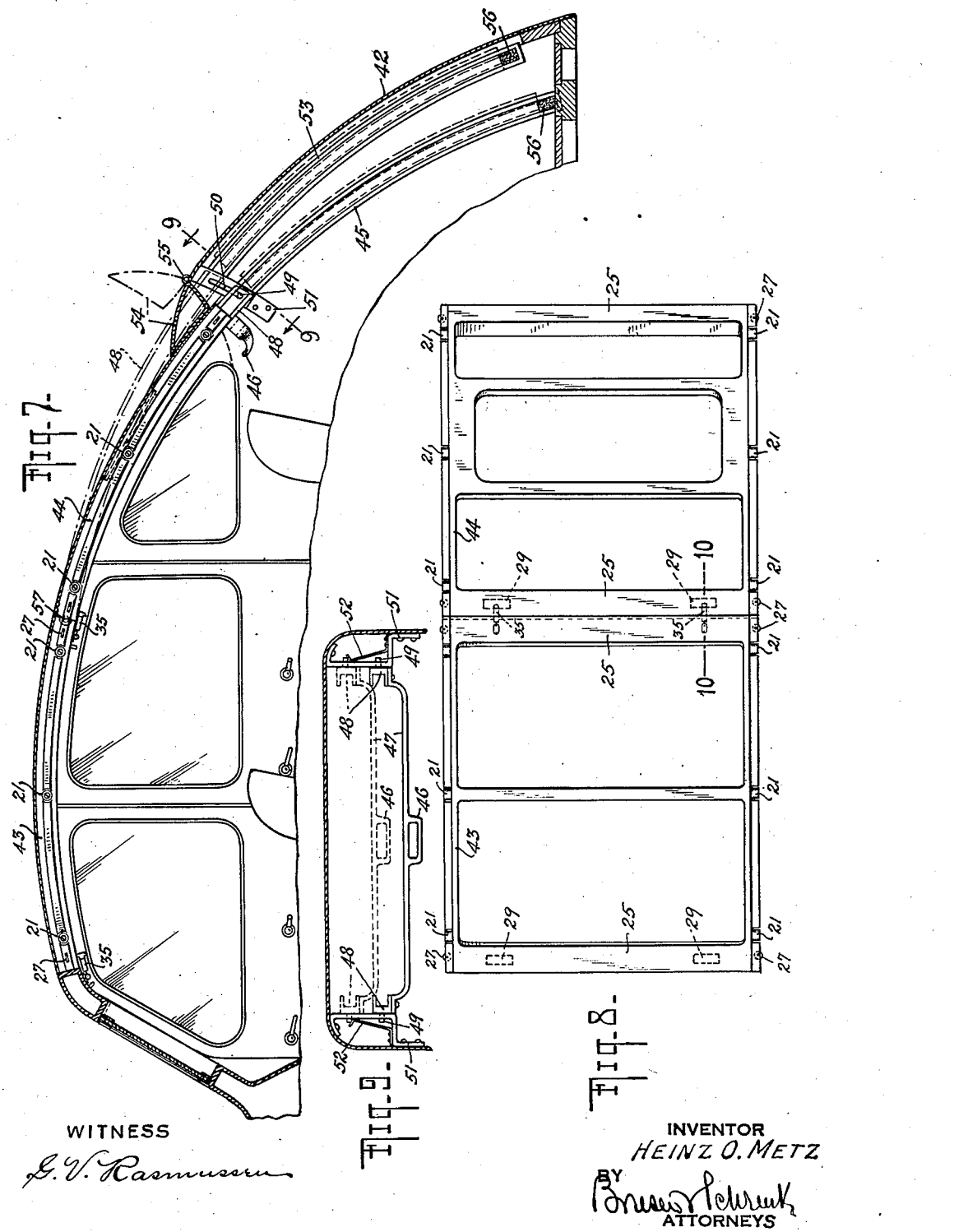
WITNESS
INVENTOR
HEINZ O. METZ
BY
ATTORNEYS Patented Sept. 3, 1935

2,013,314

UNITED STATES PATENT OFFICE 2,013,314

AUTOMOBILE ROOF CONSTRUCTION

Heinz O. Metz, Scarsdale, N. Y.

Application March 22, 1934, Serial No. 716,753

5 Claims. (Cl. 296—107)

The invention relates to a roof structure for the body of an automotive vehicle, such as an automobile, and has for its specific object to provide such automobile with a body construction, including a roof structure therefor which is slidable upon and within the body frame to serve as the top for such body when a completely closed body is desired and to be capable of being lowered into the body portion of the automobile when it is desired to convert the automobile into the open body type. The present invention enables an automotive vehicle to be alternately and at will used as a closed motor car or one which is open, i. e. without a roof.

A feature of the present invention is the fact that the change from a closed vehicle, for instance, a coupé or a sedan, to the open type, i. e. without a closed top, can be effected in a few minutes by an individual operator, while such vehicle is on the open road.

The invention is applicable to any of the several types of motor vehicles now on the market with only slight alteration in the body construction of such vehicle to adapt the same for the application thereto of my novel roof structure. It is, of course, contemplated that my novel construction of automobile roof or top would find its most advantageous application to automobiles having a body construction particularly designed for the use therein of my novel roof structure but nothing herein contained shall be regarded as limiting the applicability of my novel construction to the new design of automobile body in which the minor changes in the body to make it adapted for the fitting thereon of my new roof structure, have been made.

One of the objects of the invention is to provide a roof structure for an automobile which is not collapsible in the ordinary sense and which therefore presents a more esthetic appearance than is possible with structures of the prior art in which roof constructions of the collapsible type have been sought to be applied to motor vehicles. A further object of the invention is to provide a roof structure which, when moved into the position in which it leaves the automobile with an open body, will be substantially entirely concealed within the remaining portions of the body and in such a manner as not to interfere with the utility of all available space within the automobile and without detracting from the appearance of the vehicle.

A still further object of the invention is to provide a roof structure of simple construction and capable of easy manipulation both in the bringing of the roof structure to its position so as to be effective to form the closure of the automobile body and in its withdrawal from such effective position to its place of concealment within the body when the vehicle is desired to be converted to the open type.

Further objects of the invention consist in the provision of mechanical elements to assist the operator in bringing the roof structure to one position or the other with a minimum of effort and minimum of mechanical ingenuity necessary in the manipulation of the structure. Various specific novel features, for instance, in facilitating the movement of the sliding roof structure through the remaining body portion of the automobile, the provision of reinforcing frames, and the provision of means for attaining an effective closure of the roof against rain and dust, are included in the inventive concept.

It will be readily appreciated that the average automobile user who can afford the ownership of only one car throughout the year, is desirous of making use of his automobile under any prevailing weather conditions. However, in view of the fact that esthetic taste plays an important role in the selection of an automobile by the average user, he sacrifices the matter of convenience and utility to the matter of appearance when purchasing an automobile. For instance, during the winter months he finds it necessary to have a closed car, while during the spring and summer months dictates of convenience and utility would ordinarily prompt him to purchase an open type of car which would enable him to obtain the benefits of sunshine and fresh air while traveling, which benefits ordinarily are not obtainable when driving a closed automobile, such as a sedan or coupé. For this reason automobile manufacturers have sought to provide a type of automobile which is convertible at the will of the operator from a closed to an open type of car or vice versa. In view of the limitations of construction placed upon the automobile manufacturer by the necessity of catering to the esthetic taste of the public in the designing of automobile bodies, such manufacturers have not been heretofore capable of producing an automobile body of the type having this specific advantage without changing the design of their product in so material a respect that the automobile would not have such conventional lines as seem to be demanded by the public. With the present tendency toward extremes in body construction, for instance, the streamlining of automobile bodies, the problem becomes even more acute, for the demand for a motor car of utility and convenience as well as of appearance, is paramount.

In accordance with my invention, the familiar appearance of the automobile body is retained and yet an effective solution of the problem of conversion of the vehicle into the closed or open type at the will of the owner is made without sacrificing the utilitarian and esthetic appearance of the automobile.

Figure 6:
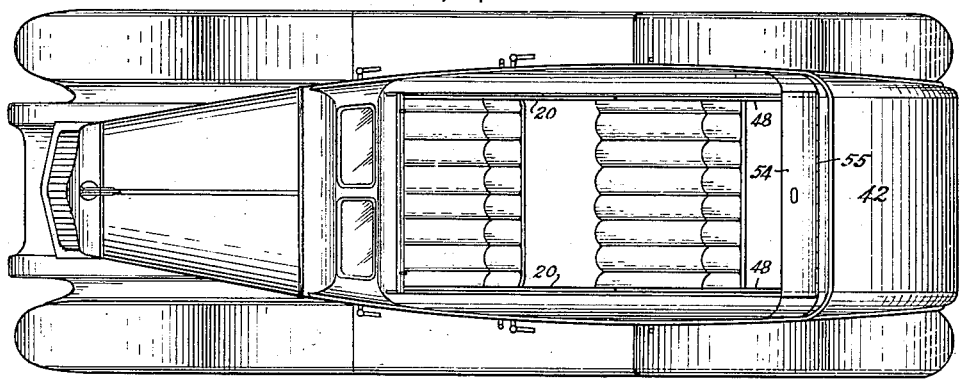
Figure 10:
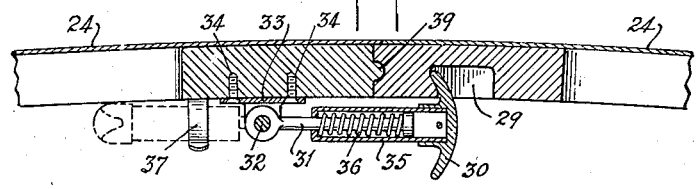
Figure 11:
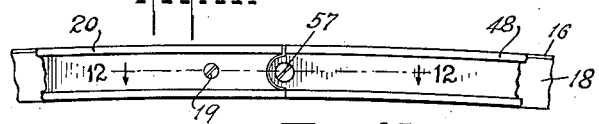
Figure 12:
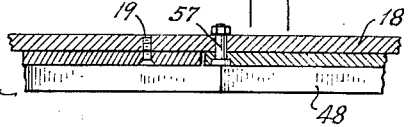

Specific embodiments of my invention are illustrated in the accompanying drawings in which Fig. 1 is a side elevation of a "roadster" type of motor car built in accordance with my invention; Fig. 2 is an enlarged sectional detail of the roof structure constructed in accordance with my invention; Fig. 3 is an enlarged section on the lines 3—3 of Figs. 1 and 7; Fig. 4 is an enlarged detail section on the lines 4—4 of Figs. 2 and 7; Fig. 5 is a side elevation of the sedan type of motor car with my invention applied thereto; Fig. 6 is a top plan view of the vehicle shown in Fig. 5 with my novel roof structure in the position in which it leaves the automobile open at the top; Fig. 7 is an enlarged detail, partly in section, of the roof structure adapted for use with the sedan type of car; Fig. 8 is a plan view of the frame supporting the roof; Fig. 9 is a section on the line 9—9 of Fig. 7; Fig. 10 is an enlarged section on the line 10—10 of Fig. 8; Fig. 11 is an enlarged detail showing the juncture of the two roof tracks used in the sedan type of car; and Fig. 12 is a section on the line 12—12 of Fig. 11.

Referring more particularly to the drawings, in which similar reference characters identify similar parts in the several views, the body of the vehicle illustrated in Fig. 1 is designated by the reference character 15. The inside portions 16 of the metallic frame of the body are recessed as shown by the flange 17 which house the frame bars 18 to which is secured at various points along its peripheral extent, by means of screws 19, the channeled runners or guide rails 20. Within the channel portions of the guide rails 20 are adapted to slide rollers 21 secured by bolts 22 to the frame 23 supporting the roof 24. The roof 24 is of the usual sheet metal construction, the side portions of which extend over and above the guide rails 20. The roof 24 is secured to the cross bars 25 of its supporting frame by means of a plurality of screws 26.

As will be noted from Fig. 3, the rollers 21 bear upon the upper surface of the lower channel members of the guide rails 20 and have a slight clearance between their upper surfaces and the lower surface of the upper channel member.

In order to facilitate the sliding movement of the frame supporting the roof structure within the guide rails 20, a plurality of rollers 27 mounted upon shafts 28 secured within recesses 29 in the longitudinal side bars of the frame extending into the guide rails 20 are provided along the side edges of the roof structure. These rollers 27 assist the sliding movement of the roof structure within the guide rails 20 during its movement within such guide rails and serve to prevent lateral movement thereof.

The structure just described permits the car owner to convert the motor vehicle at will into the closed or open type by sliding the roof frame, supporting the roof, along the guide rails 20 secured to the side frames of the body. For convenience in performing this operation, I provide the upper cross beam of the frame of the roof structure with recesses 29 constituting means for grasping the roof frame (Fig. 10) by means of which the frame and the roof supported thereon may be grasped for accomplishing the sliding movement thereof along the guide rails.

For locking the roof structure in its position in which it serves as the enclosure for the motor car, I provide a pair of spring-actuated handles 30 (Fig. 10) secured at the end of a lever 31 pivoted at 32 within a bracket 33 secured by screws 34, 34 to the cross beam of the frame. The handles 30 are secured upon a tubular casing 35 containing a compression spring 36. When the roof frame has been brought to its position over the car body, each of the handles 30 may be turned about its axis so as to have one portion thereof enter the corresponding recess 29 and by abutting against the side of the beam within such recess retain the roof frame in position. When the roof is to be moved into its concealed position, i. e. when it is desired to convert the car into the open type, the handles 30 are released from the recesses 29, turned about their axes and about the pivots of their rods 31 to the position indicated in dotted lines in Fig. 10, the casing 35 being secured within the clips 37.

For securing a tight engagement between the forward edge of the roof structure and the edge of the body frame, a tongue 39 is provided throughout the width of the edge of the body frame, which is adapted to cooperate with a correspondingly configured recess in the forward edge of the roof frame.

At the rear end of the roof frame is provided a small triangularly shaped projecting element 38 which is effective to cooperate with the beaded projection 38 at the upper edge of the rumble seat cowling.

It will be noted that my sliding roof structure is of such configuration that in the position in which it is effective to enclose the interior of the car body it blends completely with the outline of such body, while when it is in the position effective to leave the car body open at the top it is substantially entirely concealed within the portion of the body intermediate the two front seats and the "rumble" seat. As shown in dotted lines in Fig. 1, a partition wall 39 is provided in front of the rumble seat compartment and immediately rearwardly of the portion of the body into which the frame structure is adapted to slide so as to guard the rear vision window 40 from the feet of the occupants of the rumble seat. In order to provide two resilient cushioning means for the retracted roof and frame, I provide a pair of springs 41 at the extremity of the cavity into which the roof structure is adapted to slide in its concealed position. The provision of these springs also facilitates the initial movement of the roof structure upwardly when the same is grasped by the operator by means of the recesses 29, two of which may be conveniently provided in the uppermost cross bar of the roof frame.

In the embodiment of my invention illustrated in Figs. 5-9, as applied to a sedan type of car, the body of the automobile is designated by the reference character 42. In such construction, in view of the larger area of the roof and the necessity of concealing such larger roof in the small space available within the body portion rearwardly of the seats of the car, the roof structure consists of two parts, the frames 43 and 44. The guide rails for this modified form of roof structure are similar to those described in connection with the first embodiment, being illustrated in enlarged detail in Figs. 3 and 4.

The second embodiment of my inventive structure differs from that first described in that a single set of guide rails is provided for the roof frame along the top portion of the car body but a double set of such guide rails is provided in the portion of the car body into which the roof structure is to slide when converting the automobile to the open type. The structure is illustrated in enlarged detail in Fig. 7 which in full lines shows the roof structure in position above the car body and in dotted lines the course of travel for concealment of the two parts of the roof structure and their positions when concealed within the body.

In effecting the movement of the roof structure to its concealed position, the rear portion of such roof structure is first disengaged from the front portion by withdrawing the handles 30 from within the slots 29 (see Fig. 10), such structure being preferably the one shown at approximately the mid-point of the roof structure illustrated in Fig. 7. After such rear portion of the roof structure has been housed within its guide rail compartment 45, the front roof section 43 is released by withdrawing the handles 30 at the front end of the body from their recesses and such front section is brought, by sliding along the guide rails, to the position occupied by the rear section prior to its movement into its compartment 45. The handle 46 is then grasped by the operator and pushed a slight distance upwardly to the position shown in dotted lines in Fig. 9, such movement being effective, by means of the cross bar 47 to which such handle is attached, to move the guide rails 48, 48 upwardly a sufficient distance so that the pins 49 extending therefrom and through the slots 50 in the brackets 51 mounted on the side of the body clear the nose of the leaf springs 52, the guide rails being retained in their upper position by the abutment of the pins 49 against the upper surface of the projections on the leaf springs 52. In the movement of the guide rails to their upper position, the frame bars 18, to which such guide rails are secured by screws 19, are pivoted upon bolts 57 passing through said frame bars and guide rails, as shown in Figs. 11 and 12. In the upper position of the guide rails 48, they are in alignment with the guide rails 53 to the rear of the compartment 45. From this position of the front section of the roof structure (see Fig. 7), it may then be made to slide within the guide rails 48 and into the guide rails within the compartment 53. When the two portions of the roof structure have thus been guided into their compartments 45 and 53, the handle 46 may again be depressed, carrying the upper guide rails to their lower position and the substantially triangular door section 54 pivoted at 55 may be brought to its closed position so as to be effective to keep dust and rain from entering the compartments 45 and 53. Bumpers 56, 56, of any suitable cushioning material, may be provided at the bottoms of the compartments 45 and 53.

In bringing the roof structure to its position in which it is effective to enclose the interior of the car, the operations just described are performed in reverse order. The door section 54 is thrown to the position illustrated in Fig. 7 in dotted lines. The handle 46 is raised, bringing the guide rails 48 to their upper position in alignment with the guide rails in compartment 53 and the front section of the roof is brought first to the position occupied by the rear section when the roof structure is in closed position, by being grasped by means of the recesses 29 therein. When the rear section has thus been brought to such position, the handle 46 may again be depressed, bringing the guide rails 48 to their lower position in alignment with the guide rails in compartment 45 and the section moved to its forward position where it is secured by means of the forward latching mechanism. The rear section is then grasped by means of its recesses 29 and brought, by sliding in the guide rails 20, to its position rearwardly of the front section, the latch mechanism at the point of juncture of the two sections being brought into position to unite the sections. The door section 54 is then brought to its closed position so as to prevent rain and dust from entering the compartments 45 and 53.

It will be noted that at the point of juncture of the two sections of the roof structure they are united by means of the tongue 39 provided throughout the width of the rear face of the front section, so as to enter a corresponding recess in the front face of the rear section of the roof. This construction makes the roof line of junction waterproof so as to prevent access of rain or dust to the interior of the car.

I claim:

1. The combination of a vehicle body having at each side a pair of bar elements pivoted at their meeting edges with a roof structure comprising a plurality of guide rails, a frame slidably mounted upon said guide rails and consisting of two sections detachably secured together, and a roof secured to each of said frame sections.

2. The combination with a vehicle body of a roof structure comprising two pairs of bar elements, each pair being pivoted at their abutting ends, a frame having two sections detachably secured to each other at their meeting edges, a roof secured to each of said frame sections, a single set of guide rails running substantially throughout the length of each pair of said bar elements, and a double set of guide rails running substantially throughout the remainder of the vehicle body in substantial alignment with said single set of guide rails.

3. A vehicle roof structure comprising two pairs of bar elements, the bar elements of each pair being pivoted and secured to each other at their meeting ends, a single guide rail secured to each bar element of a pair of said bar elements, a set of double guide rails, two frame sections slidably mounted in said guide rails, a roof for each of said sections, and means for raising said set of double guide rails to a position in which they are in alignment with said single guide rails.

4. A vehicle roof structure comprising two pairs of bar elements, the bar elements of each pair being pivoted and secured to each other at their meeting ends, a single guide rail secured to each bar element of a pair of said bar elements, a set of double guide rails, two frame sections slidably mounted in said guide rails, a roof for each of said sections, and means for raising said set of double guide rails to a position in which they are in alignment with said single guide rails, said means comprising a cross bar, a handle on said cross bar, a pair of brackets having slots therein, pins extending from said guide rails through said slots and a pair of leaf springs having abutment ends and secured to said brackets.

5. The combination of a vehicle body having at each side a pair of bar elements pivoted at their meeting edges with a roof structure comprising a frame having two sections detachably secured together at their meeting edges, a roof for each of said sections, a set of guide rails within which said frame is adapted to slide, and a double set of guide rails positioned rearwardly of said first set, the rear portion of said first set of guide rails being adapted to be raised or lowered at one end, to bring the same into alignment with either of the guide rails of said double set.

HEINZ O. METZ.